United States Patent Office 3,029,208
Patented Apr. 10, 1962

3,029,208
CELLULAR POLYURETHANE AND PROCESS
OF PREPARING SAME
Antoine Khawam, Arbutus, Md., assignor to Allied Chemical Corporation, New York, N.Y., a corporation of New York
No Drawing. Filed July 3, 1959, Ser. No. 824,779
4 Claims. (Cl. 260—2.5)

This invention relates to novel polyesters and novel compositions containing the new polyesters in the production of polyurethane cellular products and more particularly refers to new and improved polyesters derived in part from polyols which contain in their molecule a plurality of tertiary nitrogen atoms especially suitable for reaction with polyisocyanates to yield improved rigid polyurethane cellular compositions.

Cellular polyurethane plastics have been prepared by reacting a polyisocyanate with an alkyd resin in the presence of various additives and/or modifiers. Such polyurethane compositions are described in U.S. Patents 2,591,884; 2,780,350; 2,802,795. These additives include foam stabilizing agents, fillers, plasticizers, both inert and reactive with respect to the isocyanate group, reaction accelerators, emulsifiers, etc., and are employed to alter physical properties such as density, cell strength, flexibility of the resultant foam. These foamable mixtures are used to produce shock absorbing and temperature insulating panels, as these are generally of the sandwich type construction in which the foams are prepared "in situ." A serious disadvantage of these prior art foams has been the presence of an overall brittle surface layer which can only be removed by heating at the curing stage. Frequently the brittle layer, though adhering strongly to a surface, crumbles in use sufficiently to cause separation of the main body of cellular material.

In general rigid polyurethane foams are prepared from branched polyesters containing hydroxyl and/or carboxyl groups by reaction with polyisocyanates in the presence of water. Depending upon the reaction conditions and/or the structure of the polyester and/or the presence of various additives and modifiers the physical properties of the cellular material obtained may be varied to suit the desired use of the foam. In general, an accelerator is employed to speed up the foaming reaction as well as to catalyze the reaction of the isocyanate groups with the reactive groups of the polyester. The usual accelerators are tertiary amines free of groups reactive with the isocyanate group (U.S. 2,650,212) or esters obtained from alcohols containing a tertiary nitrogen atom (German Patent 950,151). However, these accelerators often give rise to an appreciable time lag between the foaming reaction and the setting of the resinous cellular mass to a nonflowable stage. This time lag is a disadvantage in the employment of the polyurethane cellular material for direct application, e.g. by spraying of a mixture of the reactants onto vertical or overhead surfaces. In many instances the foaming mass runs down the vertical surface or drips from overhead member before setting occurs. This has been a major disadvantage of spraying techniques for the application of polyurethane cellular materials to vertical and overhead surfaces. By the use of larger quantities of a tertiary amine accelerator (free of groups reactive with isocyanate) it is possible to produce a rapid set polyurethane foam, but foams thus obtained suffer from numerous defects, and thus leave much to be desired. Other difficulties encountered in the production of cellular polyurethane foams are brittleness, i.e. tendency to crumble and break down the cellular structure, and lack of dimensional stability, i.e. tendency to shrink and distort.

An object of the present invention is to provide new polyesters especially adapted for use in the production of polyurethane foams. Another object is to provide compositions which yield dimensionally stable, rigid polyurethane cellular materials which are not brittle and have a tough elastic surface layer. A further object of the present invention is to provide foamable mixtures of new polyesters, polyisocyanates and a blowing agent which yield low density, rapid setting, rigid polyurethane cellular materials. Other advantages and objects of the present invention will be evident from the following description.

The polyesters according to the present invention are obtained by reacting one or more polybasic organic acids with a mixture of polyhydric alcohols comprising (1) polyhydric alcohols of the general formula:

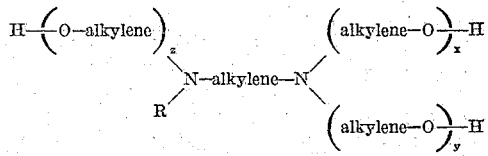

wherein alkylene means a divalent saturated aliphatic radical having at least 2 carbon atoms, preferably not more than 5 carbon atoms, $x$, $y$ and $z$ are whole numbers and the sum of $x$, $y$ and $z$ is from 3 to 10, preferably from 3 to 6, at least two of the $(\text{alkylene-O})_{x,y,z}\text{H}$ groups contain primary alcoholic hydroxyl groups and R is a large alkyl group containing from 10 to 25 carbon atoms, and (2) polyhydric alcohols containing only carbon, hydrogen and oxygen, and the polyhydric alcohols from (1) and (2) are employed in such proportions that from 1 to 15 alcoholic OH groups are contributed by (1) for every 10 alcoholic OH groups contributed by (2).

Due to the presence of the two tertiary amino groups in the trihydric alcohol used in the preparation of the new polyols, such polyols act as catalysts for the reaction with the polyisocyanate resulting in the production of rapidly curing low density polyurethane compositions. The R alkyl radical of from about 10 to about 25 carbon atoms contained in the polyol of the invention acts as an internal plasticizer group aiding in the elimination of the friable layer associated with low density rigid polyurethane foam that is not heat cured.

Although it is not known with certainty, it is believed that the polyesters of the present invention described above function in the following manner:

(1) The terminal hydroxyl groups provide reactive centers to combine with the carboxyl groups of the polybasic acid and/or subsequently to combine with the NCO groups of the polyisocyanate to form urethane linkages;

(2) The tertiary nitrogen atoms serve to provide the necessary accelerating moieties to improve the reaction rate of the polyester and polyisocyanate thus helping to reduce the density and to hasten the curing of the polyurethane polymer;

(3) The higher alkyl radical functions as an internal plasticizer thus assisting in preventing or at least minimizing the formation of the friable layer of polymeric material.

The prepartion of polyesters is generally well known in this art. The usual method of heating together a polybasic acid and polyol in the presence or absence of a volatile solvent and/or esterification catalyst until the acid number and/or hydroxyl value of the resulting mixture has attained a predetermined value, has been described in numerous prior art communications and patents in this field. The following patents which are typical of the polyester art are U.S. Patents 2,453,644; 2,593,787; 2,409,633; 2,443,735–741; 2,450,552; 2,255,313; 2,512,410. The reaction of the ingredients is carried in the preparation of the polyester to that point at which the product has the desired properties. In general the consistency or viscosity of the polyester varies directly with the average number of acid and alcohol residues in the molecule, which can vary from about three to about one hundred twenty. The reaction is effected at a temperature high enough and for a time long enough to secure the desired viscosity, acid number, etc. Elevated temperatures, e.g. about 160° to 180° C. are preferably employed to expedite the reaction. The use of inert gases such as nitrogen, carbon dioxide or the like, to provide a non-oxidizing atmosphere for the reaction is preferred in order to prevent darkening of the product and to make it possible to obtain a pale or colorless product. Bubbling the inert gas through the reaction mass is advantageous since the gas served the added functions of agitation and of expediting the removal of water formed by the reaction.

The polyesters of the present invention are obtained by esterification of one or more polybasic organic acids with a mixture of polyhydric alcohols including a polyhydric alcohol containing a plurality of tertiary basic nitrogen atoms and containing an alkyl group in which the alkyl radical contains from 10 to about 25 carbon atoms. The amount of the polyhydric alcohol mixture employed to react with the polybasic organic acid is such that the resulting polyester has predominantly terminal hydroxyl groups, with a hydroxyl number in the range of from 350 to 500, preferably from 400 to 450. Suitable organic acids are adipic, sebacic, oxalic, maleic, phthalic, isophthalic, terephthalic, succinic, citric, "dimer" acids (dimerized fatty acids) etc., and mixtures thereof. Polyhydric alcohols for preparing the polyester include ethylene glycol, propylene glycol, butylene glycol, diethylene glycol, polyethylene glycol, polypropylene glycol, trimethylolethane, trimethylolpropane, hexanetriol, pentaerythritol, sorbitol, mannitol, etc., and mixtures thereof. The amount of diamino polyhydric alcohol employed in the mixture of alcohols for the polyester production is such that from 1 to 15 alcoholic OH groups are contributed by the trihydric alcohol containing a plurality of N atoms for every 10 alcoholic OH groups available from the other polyhydric alcohols used in the polyol synthesis. The polyhydric alcohols of the general formula:

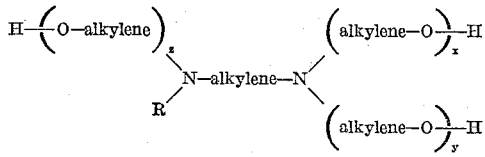

as defined hereinbefore, that are suitable for the manufacture of the special polyesters, are hydroxyalkyl alkylene polyamines, e.g. N-alkyl-tri(2-hydroxyethyl)-propylene diamine (the commercially available "Ethoduomeens" are of this type wherein the alkyl group is a long chain fatty radical derived from animal or vegetable fats). The alkyl group may contain unsaturation, and is specifically illustrated by lauryl ($C_{12}H_{25}$), myristyl ($C_{14}H_{29}$), palmityl ($C_{16}H_{33}$), stearyl ($C_{18}H_{37}$), and oleyl ($C_{18}H_{35}$).

In the usual manner for producing foams and foam coatings, the polyurethane reaction mixture generally includes an emulsifier or dispersing agent to insure uniform and adequate distribution of all reactants. Usually the dispersing agent is blended with the water or other blowing agent, and the resulting mixture is incorporated with the polyester before addition of the polyisocyanate. The uniform dispersion of the blowing agent in the reaction mass results in the formation of even cell structure from the gas generation. Suitable emulsifiers or dispersing agents include polyethylene glycol ricinoleates, silicone oils, sorbitan esters of fatty acids and quaternary ammonium salts, the preferred compounds being non-ionic. The formulation for the foramable compositions of necessity contains a blowing agent. This ingredient can be a gas such as carbon dioxide which is generated by the reaction of water with isocyanate groups present in excess over that required to react with the polyester, or a fluorinated hydrocarbon such as difluorodichloromethane. Both types of blowing agents are well known in this art, and no extended discussion of this feature of the novel compositions is believed necessary.

In the production of polyurethane cellular materials the polyisocyanate and polyol are allowed to react in the presence of water, dispersing or emulsifying agents and optionally other modifying additives or fillers. Due to the basic character of the diamino polyhydric alcohols incorporated in the polyester no additional base is required to accelerate the isocyanate reaction, i.e. polymer formation and foam, gas production.

Various organic polyisocyanates may be employed in the process of the present invention. The preferred compounds are aromatic diisocyanates such as the phenylene diisocyanates, the tolylene diisocyanates (pure isomers or isomeric mixtures thereof), the naphthalene diisocyanates, 4,4′-diphenylmethane diisocyanates or substitution products thereof, e.g. the 3,3′-dialkyl or dihalogeno-4,4′-diphenylmethane diisocyanates. Such diisocyanates may be modified by partial reaction with compounds such as hexanetriol or trimethylolpropane.

The amount of organic polyisocyanate employed is such that there is an excess of available isocyanato groups over the available active hydrogen groups contained in the polyester.

The more detailed practice of the invention is illustrated by the following examples in which parts given are by weight and temperature is degrees centigrade.

*Example 1*

A mixture consisting of 3 mols adipic acid, 4.0 mols of trimethylolpropane and 0.5 mol of N-tallow-N,N′,N′-tris(2-hydroxyethyl)propylenediamine, "Ethoduomeen T/13" having an average mol. wt. of 530 was reacted for three hours in an atmosphere of nitrogen at 160–180°. About 105–110 ml. of water were collected during the condensation. The polyester so obtained had a hydroxyl number of about 430–450 and an acid number of about 5.

To a vigorously agitated mixture of 100 parts of the above polyester, 4 parts of water and 4 parts of emulsifying agent "Emulphor EL-719" (a polyethylene glycol ricinoleate) there were added 180 parts of a modified tolylene diisocyanate "Nacconate 1080H" (amine equivalent of about 120, from the reaction of tolylene diisocyanate, 80% 2,4-isomer and 20% 2,6-isomer, with 10% by weight of 1,2,6-hexanetriol). The foamable mixture was poured into suitable mold in which it set within five minutes of mixing to a curable cellular mass with a tough elastic skin. The foam was cured at room temperature in about 24 hours. The completely cured material was a rigid foam with a fine uniform cell structure, having a density of 1.8 lbs. per cu. ft. and a compression strength of 14 p.s.i. at 10% deflection.

A foam prepared from a similar polyester having no diamino trihydric alcohol incorporated therein required the addition of a conventional non-reactive tertiary amine catalyst to attain the required density and on setting developed a friable surface layer to a depth of about one inch.

*Example 2*

(A) A polyester was prepared by condensing in the usual manner 3 mols of adipic acid, 4.3 mols of trimethylolpropane and 0.2 mol of N-tallow-N,N′,N′-tris(2-hydroxyethyl)propylenediamine in an atmosphere of nitrogen for about 3 hours at 160° to 180°.

(B) To a blend of 100 parts of the above polyester, 4 parts of water and 4 parts of emulsifier ("Emulphor EL-719") there was added with stirring 115 parts of tolylene diisocyanate ("Nacconate 80," 80% 2,4-isomer and 20% 2,6-isomer). The resultant mixture was poured into molds and allowed to expand fully at room temperature to produce a coarse celled mass having a tough elastic skin. The foam exhibited no shrinkage on heating to about 110° for 24 hours. The completely cured material was a rigid foam having a density of 1.7 lbs. per cu. ft. and a compression strength of 10 p.s.i. at 10% deflection.

(C) 100 parts of the polyester employed above were mixed with 4 parts of water, 4 parts of an emulsifying agent ("Emulphor EL-719") and 180 parts of modified tolylene diisocyanate ("Nacconate 1080H," amine equivalent about 120, from 90% by weight "Nacconate 80" reacted with 10% by weight 1,2,6-hexanetriol) to produce a foamable mass. The cellular material so obtained developed a tough elastic skin immediately on setting, was cured at room temperature. The cured resin had an extremely fine uniform cellular structure. This rigid foam has a density of 2.0 lbs. per cu. ft. and a compression strength of 22 p.s.i. at 8% deflection.

Example 3

A polyester was prepared in the usual manner from a mixture of 3 mols of adipic acid, 4.4 mols of trimethylolpropane and 0.1 mol of N-tallow-N,N',N'-tris(2-hydroxyethyl)propylenediamine by condensation at 160–180° under an atmosphere of nitrogen. The resulting polyester has a hydroxyl number of about 430–450 and an acid number below 10.

100 parts of the above polyester were blended with 4 parts of water and 4 parts of emulsifier ("Emulphor EL-719") and to the resultant mixture there was added 180 parts of tolylene diisocyanate ("Nacconate 80," 80% 2,4-isomer and 20% 2,6-isomer). The foamable reaction mixture was poured into molds and allowed to expand freely at room temperature. The rigid foam thus obtained has a density of 2.75 lbs. per cu. ft., a compression strength of 40 p.s.i. at 11% deflection and is distinguished by the absence of a friable surface layer.

Example 4

A polyeser was prepared from 3 mols adipic acid, 4.3 mols trimethylolpropane and 0.2 mol "Ethoduomeen T/13," (alkoxylated alkylene diamine having an average mol wt. 530, and the formula:

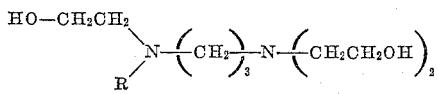

wherein R is a tallow hydrocarbon radical by heating at 160–180° for three hours and removing 100 parts water. The resulting polyester had a hydroxyl number of about 430–440 and an acid number of about 5.

To produce a rigid polyurethane cellular material which adheres strongly to vertical surfaces a two-component mixture employing the above polyester can be used with a spray gun. One component is an emulsion of the polyester (100 parts) with water (4 parts) and an emulsifier (4 parts "Emulphor EL-719"); the second component is a modified tolylene diisocyanate (180 parts "Nacconate 1080H"). The foaming mass formed by spray mixing these two components set rapidly on the vertical surface. The resultant foam had an extremely fine and uniform cellular structure, a density of 2.0 lbs. per cu. ft., and an elastic and non-friable skin.

Although certain preferred embodiments of the invention have been disclosed for purpose of illustration, it will be evident that various changes and modifications may be made therein without departing from the scope and spirit of the invention.

I claim:
1. A process for the production of dimensionally stable, rigid polyurethane cellular materials which are not brittle and have a tough elastic layer which comprises first producing a polyester by reacting a dicarboxylic acid with a mixture of polyhydric alcohols comprising (1):

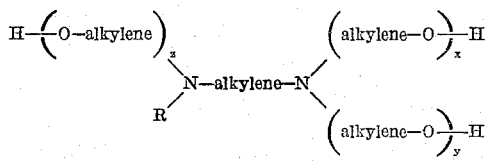

wherein alkylene means a divalent saturated aliphatic radical having at least 2 carbon atoms, x, y and z are whole numbers and the sum of x, y and z is from 3 to 6, at least two of the groups selected from the groups consisting of (alkylene-O)$_x$H, (alkylene-O)$_y$H and (alkylene-O)$_z$H contain primary alcoholic hydroxyl groups, and R is an alkyl group containing from 10 to 25 carbon atoms, and (2) polyhydric alcohols containing only carbon, hydrogen and oxygen, with the polyhydric alcohols from (1) and (2) employed in such proportions that from 1 to 15 alcoholic OH groups are contributed by (1) for every 10 alcoholic OH groups contributed by (2), said polyester having predominately terminal hydroxyl groups with a hydroxyl number within the range of 350 to 500, and then admixing the polyester with an organic polyisocyanate in an amount such that there is an excess of available isocyanato groups over the available active hydrogen groups contained in the polyester, and effecting the reaction by admixture of the polyester and organic polyisocyanate in the presence of a blowing agent selected from the group consisting of water and fluorinated hydrocarbon.

2. A process for the production of dimensionally stable, rigid polyurethane cellular materials which are not brittle and have a tough elastic layer which comprises first producing a polyester by reacting a dicarboxylic acid with a mixture of polyhydric alcohols comprising (1):

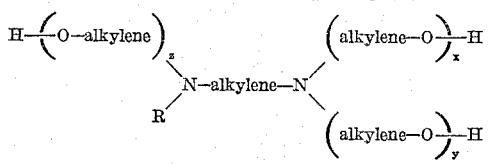

wherein alkylene means a divalent saturated aliphatic radical having 2–6 carbon atoms, x, y and z are whole numbers and the sum of x, y and z is from 3 to 6, at least two of the groups selected from the groups consisting of (alkylene-O)$_x$H, (alkylene-O)$_y$H and (alkylene-O)$_z$H contain primary alcoholic hydroxyl groups and R is an alkyl group containing from 10 to 25 carbon atoms, and (2) polyhydric alcohols containing only carbon, hydrogen and oxygen, with the polyhydric alcohols from (1) and (2) employed in such proportions that from 1 to 15 alcoholic OH groups are contributed by (1) for every 10 alcoholic OH groups contributed by (2), said polyester having predominately terminal hydroxyl groups with a hydroxyl number within the range of 350 to 500, and then admixing the polyester with an organic polyisocyanate in an amount such that there is an excess of available isocyanato groups over the available active hydrogen groups contained in the polyester, and effecting the reaction by admixture of the polyester and organic polyisocyanate in the presence of water.

3. A dimensionally stable rigid polyurethane cellular material which is not brittle and has a tough elastic layer obtained by first producing a polyester by reacting a dicarboxylic acid with a mixture of polyhydric alcohols comprising (1):

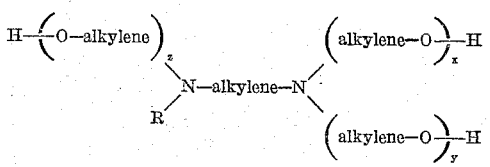

wherein alkylene means a divalent saturated aliphatic radical having at least 2 carbon atoms, x, y and z are whole numbers and the sum of $x$, $y$ and $z$ is from 3 to 6, at least two of the groups selected from the groups consisting of $\text{(alkylene-O)}_x\text{H}$, $\text{(alkylene-O)}_y\text{H}$ and $\text{(alkylene-O)}_z\text{H}$ contain primary alcoholic hydroxyl groups and R is an alkyl group containing from 10 to 25 carbon atoms, and (2) polyhydric alcohols containing only carbon, hydrogen and oxygen, with the polyhydric alcohols from (1) and (2) employed in such proportions that from 1 to 15 alcoholic OH groups are contributed by (1) for every 10 alcoholic OH groups contributed by (2), said polyester having predominately terminal hydroxyl groups with a hydroxyl number within the range of 350 to 500, and then admixing the polyester with an organic polyisocyanate in an amount such that there is an excess of available isocyanato groups over the available active hydrogen groups contained in the polyester, and effecting the reaction by admixture of the polyester and organic polyisocyanate in the presence of a blowing agent selected from the group consisting of water and fluorinated hydrocarbon.

4. A dimensionally stable rigid polyurethane cellular material which is not brittle and has a tough elastic layer obtained by first producing a polyester by reacting a dicarboxylic acid with a mixture of polyhydric alcohols comprising (1):

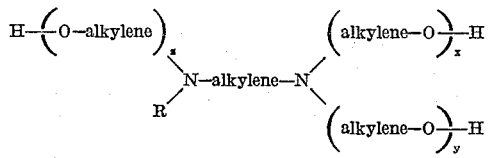

wherein alkylene means a divalent saturated aliphatic radical having 2–6 carbon atoms, $x$, $y$ and $z$ are whole numbers and the sum of $x$, $y$ and $z$ is from 3 to 6, at least two of the groups selected from the groups consisting of $\text{(alkylene-O)}_x\text{H}$, $\text{(alkylene-O)}_y\text{H}$ and $\text{(alkylene-O)}_z\text{H}$ contain primary alcoholic hydroxyl groups and R is an alkyl group containing from 10 to 25 carbon atoms, and (2) polyhydric alcohols containing only carbon, hydrogen and oxygen, and the polyhydric alcohols from (1) and (2) are employed in such proportions that from 1 to 15 alcoholic OH groups are contributed by (1) for every 10 alcoholic OH groups contributed by (2), said polyester having predominately terminal hydroxyl groups with a hydroxyl number within the range of 350 to 500, and then admixing the polyester with an organic polyisocyanate in an amount such that there is an excess of available isocyanato groups over the available active hydrogen groups contained in the polyester, and effecting the reaction by admixture of the polyester and organic polyisocyanate in the presence of water.

References Cited in the file of this patent
UNITED STATES PATENTS

| | | |
|---|---|---|
| 2,281,415 | Coffman | Apr. 28, 1942 |
| 2,788,332 | Muller et al. | Apr. 9, 1957 |
| 2,841,572 | McMahon | July 1, 1958 |
| 2,888,408 | Rogers et al. | May 26, 1959 |
| 2,956,031 | Khawam | Oct. 11, 1960 |